United States Patent [19]

Daugherty

[11] Patent Number: 4,852,593
[45] Date of Patent: Aug. 1, 1989

[54] APPARATUS AND METHOD FOR WASHING VEHICLES

[75] Inventor: William T. Daugherty, Bristol, Tenn.

[73] Assignee: Magic Spray Inc., Bristol, Va.

[21] Appl. No.: 30,355

[22] Filed: Mar. 26, 1987

Related U.S. Application Data

[62] Division of Ser. No. 744,637, Jun. 14, 1985, abandoned.

[51] Int. Cl.$^4$ .............................................. B08B 3/02
[52] U.S. Cl. ...................................... 134/94; 134/123; 134/172
[58] Field of Search ............... 134/26, 45, 94, 123, 134/172, 178, 58 R, 56 R; 15/DIG. 2; 239/8, 11

[56] References Cited

U.S. PATENT DOCUMENTS

| | | | |
|---|---|---|---|
| 1,680,796 | 8/1928 | Lostetter | 134/123 |
| 2,862,222 | 12/1958 | Cockrell | 15/302 |
| 3,038,481 | 6/1962 | Brechtel | 134/57 |
| 3,175,564 | 3/1965 | Baird | 134/58 |
| 3,339,565 | 9/1967 | Williams | 134/58 |
| 3,438,583 | 4/1969 | Lawrence III | 134/123 X |
| 3,587,807 | 6/1971 | Hickman | 194/13 |
| 3,595,268 | 7/1971 | Archer | 134/100 |
| 3,726,293 | 4/1973 | Padek | 134/45 |
| 3,774,625 | 11/1973 | Wiltrout | 134/104 |
| 3,795,254 | 3/1974 | Blosser | 134/123 |
| 3,844,836 | 10/1974 | Lesser | 134/6 |
| 4,194,923 | 3/1980 | Johnson | 134/6 |

FOREIGN PATENT DOCUMENTS 1901121  8/1970  Fed. Rep. of Germany ...... 134/123

Primary Examiner—Frankie L. Stinson
Attorney, Agent, or Firm—Lalos & Keegan

[57] ABSTRACT

A vehicle washing apparatus. The apparatus utilized a support for supporting the vehicle, a first low pressure pump for applying a first solution at low pressure, a second low pressure pump for applying a second solution at low pressure and a spraying arrangement for applying fluid at high pressure to remove the first and second solutions from the vehicle.

47 Claims, 8 Drawing Sheets

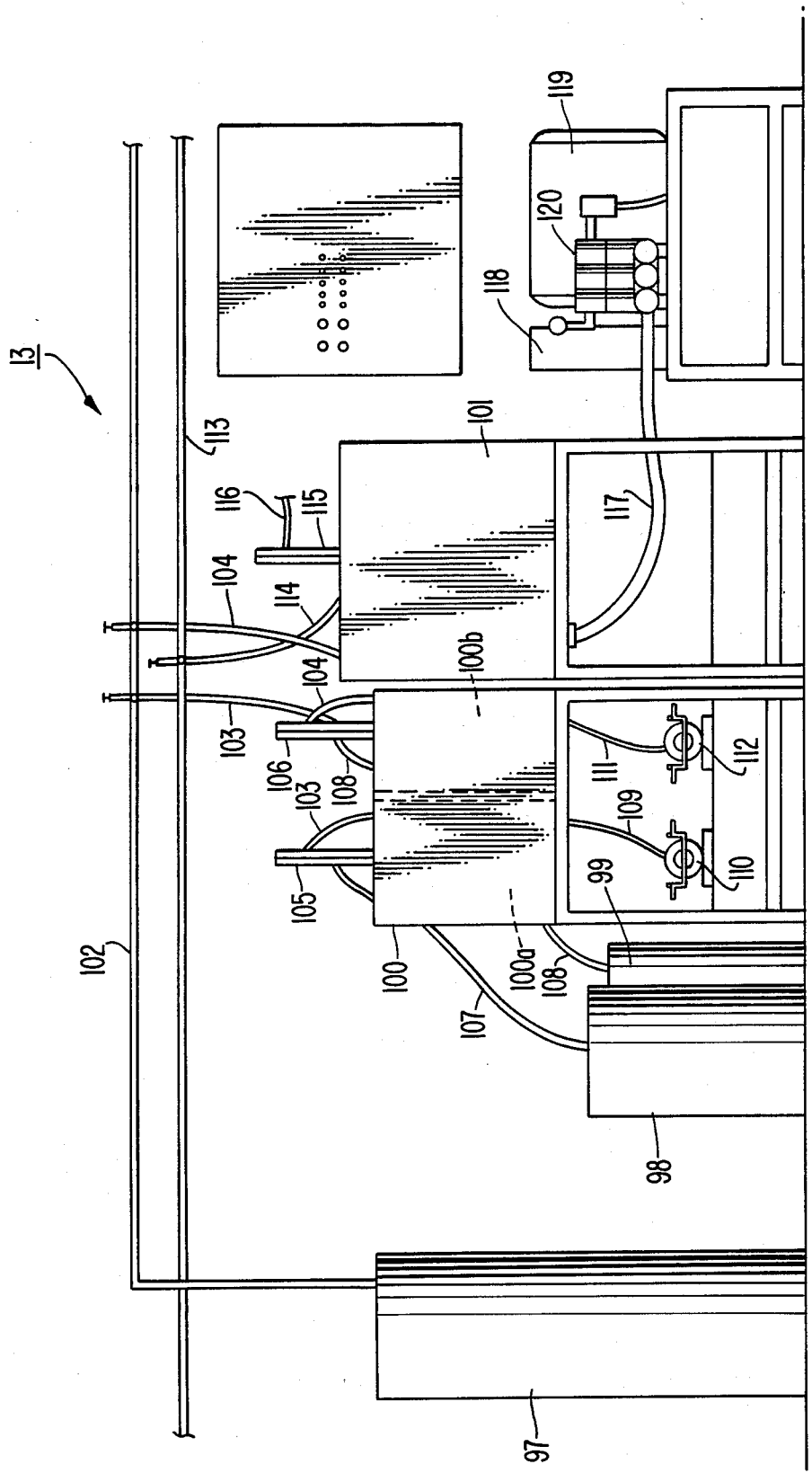

APPARATUS AND METHOD FOR WASHING VEHICLES

This is a divisional of copending application Ser. No. 744,637 filed on June 14, 1985, and now abandoned.

This invention relates to an apparatus and method for washing vehicles, and more particularly to a brushless type of apparatus and method for washing vehicles.

In the prior art, there as been developed an automatic type of vehicle washing apparatus which utilizes a plurality of rotating brushes, a plurality of movable strips of wiping cloth or a combination of rotating brushes and wiping strips for washing a vehicle either while the vehicle is stationary or moving through the apparatus. Such arrangements have been found not to be satisfactory in that the contact of such cleaning devices with the surface areas of the vehicle often results in damage to various protruding portions of the vehicle such as radio antennas, hood and trunk ornaments, windshield wipers, detached trim and the like.

More recently, there has been developed an improved type of apparatus for washing vehicles which eliminates the contact of such devices as brushes and wiping strips with the surfaces of the vehicle and which utilizes merely the application of streams of fluid for providing the cleaning action, commonly referred to as brushless car washes. Although such brushless car washes generally have been effective in eliminating the undesirable features of brush type washes, it also has been found that such brushless washes are not entirely effective in providing an acceptable washing action economically from the standpoints of initial capital investment and operating and maintenance costs.

Accordingly, it is the principal object of the present invention to provide a novel apparatus for washing vehicles.

Another object of the present invention is to provide an improved apparatus for washing vehicles which eliminate the necessity of cleaning devices which contact the surfaces of the vehicle.

A further object of the present invention is to provide a novel apparatus for washing a vehicle which is automatic in operation.

A still further object of the present invention is to provide an improved automatic apparatus for washing vehicles which is coin operated.

Another object of the present invention is to provide an improved apparatus for washing vehicles efficiently and effectively.

Another object of the present invention is to provide an improved automatic apparatus for washing vehicles which utilizes a minimal cycle time.

A further object of the present invention is to provide an improved apparatus for washing vehicles which utilizes a minimal amount of chemicals and other rinsing fluids in quickly and effectively providing the washing action.

A still further object of the present invention is to provide a novel apparatus for washing vehicles which is comparatively simple in design, relatively inexpensive to operate and easy to maintain.

Another object of the present invention is to provide a novel carrier unit adapted to be propelled about an elevated, closed loop track of an apparatus for washing vehicles.

A further object of the present invention is to provide a novel method of washing vehicles.

A still further object of the present invention is to provide a novel method of washing vehicles which eliminates the need for contacting the surfaces of the vehicle with cleaning devices such as rotating brushes and oscillating strips of cloth.

Another object of the present invention is to provide a novel method for washing vehicles which is highly effective in removing foreign substances from the surface areas of vehicles without causing damage to various surfaces and components of a vehicle.

A still further object of the present invention is to provide a novel method of washing a vehicle which utilizes a minimal amount of chemicals and rinsing fluids.

Another object of the present invention is to provide a novel method of washing vehicles which is efficient, economical and effective.

Other objects and advantages of the present invention will become more apparent to those persons having ordinary skill in the art to which the present invention pertains from the following description taken in conjunction with the accompanying drawings wherein:

FIG. 8 is a side elevational view of the storage tanks and various control devices of the apparatus shown in FIGS. 1 through 6.

Figure 1:
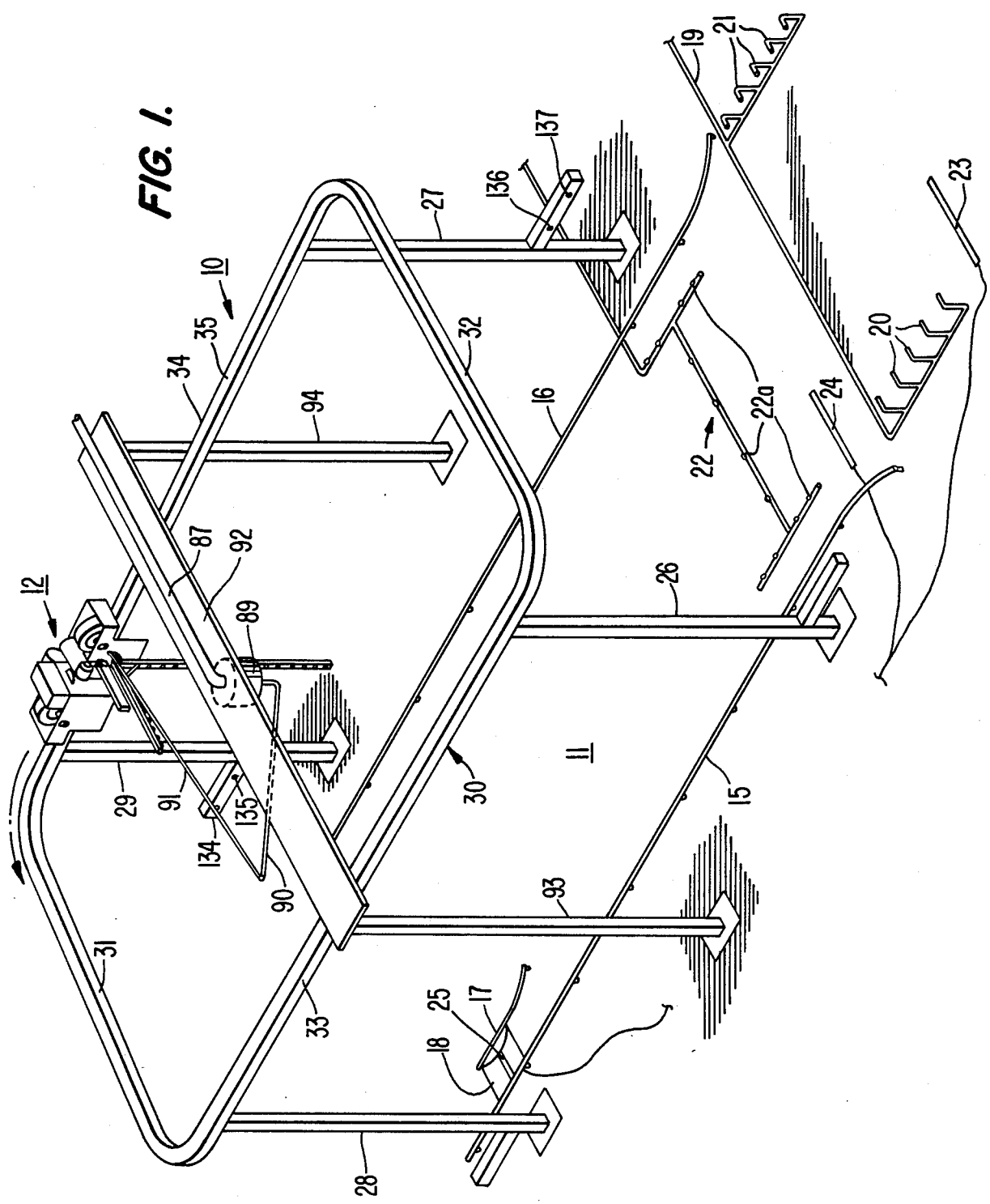
FIG. 1 is a perspective view of an embodiment of the invention.

Referring to the drawings, there is illustrated an embodiment of the invention which generally includes an elevated, closed loop track assembly 10 mounted on a vehicle support surface 11, a carrier unit 12 mounted on the track assembly and adapted to be cycled about the track assembly in a programmed sequence, a fluid supply assembly 13 communicable with the carrier unit for supplying various chemicals and fluids to the carrier unit for application by the carrier unit onto a vehicle positioned on support surface 11, and a control system 14 for automatically operating the entire system.

The support surface for the vehicle is provided with a pair of transversely spaced, longitudinally disposed wheel guide rails 15 and 16 for guiding a vehicle to be washed into position within the elevated track assembly. The surface further is provided with a short guide rail 17 spaced from guide rail 15 adjacent the leading end thereof which functions to guide the left front wheel of a vehicle to be washed into a wheel well 18 thus positioning the vehicle in the desired location within the elevated track assembly.

Disposed adjacent the trailing ends of guide rails 15 and 16, is a spray unit 19 having parallel sets of spray heads 20 and 21 for directing sprays of cleaning fluid inwardly relative to each other for washing the wheels of a vehicle driven onto support surface 11. Also disposed between the trailing ends of guide rails 15 and 16 is a spray unit 22 having an array of spray heads 22a for directing sprays of cleaning fluids upwardly to wash the undercarriage of a vehicle driven into position on support surface 11. As best illustrated in FIG. 1, spray unit 19 is activated for a predetermined time period by actuation of a pressure switch 23 in the path of the left front wheel of the vehicle being driven onto the support surface. Spray unit 22 is activated by the contact of the left front wheel of the vehicle with a pressure switch 24 disposed between the trailing ends of guide rails 15 and 16 and between spraying units 19 and 22. The sequencing of the carrier unit commences upon the vehicle being positioned in a start position within the elevated track assembly with the left front wheel seated in wheel well 18. When in the start position, the left front wheel of the vehicle actuates pressure switch 25 to activate the sequencing of the carrier unit.

Track assembly 10 generally includes a pair of rearwardly disposed post members 26 and 27, a pair of forwardly disposed post members 28 and 29, and a closed loop track 30 rigidly secured on the upper ends of the post members. Track 30 has a substantially rectangular configuration with rounded corners and includes front and rear sections 31 and 32 and side sections 33 and 34. The track preferably is of a box beam construction, formed of aluminum and provided with a flat, upper track surface 35. It is contemplated that the track can be formed of extruded sections and welded together at the erection site of the system.

Figure 4:
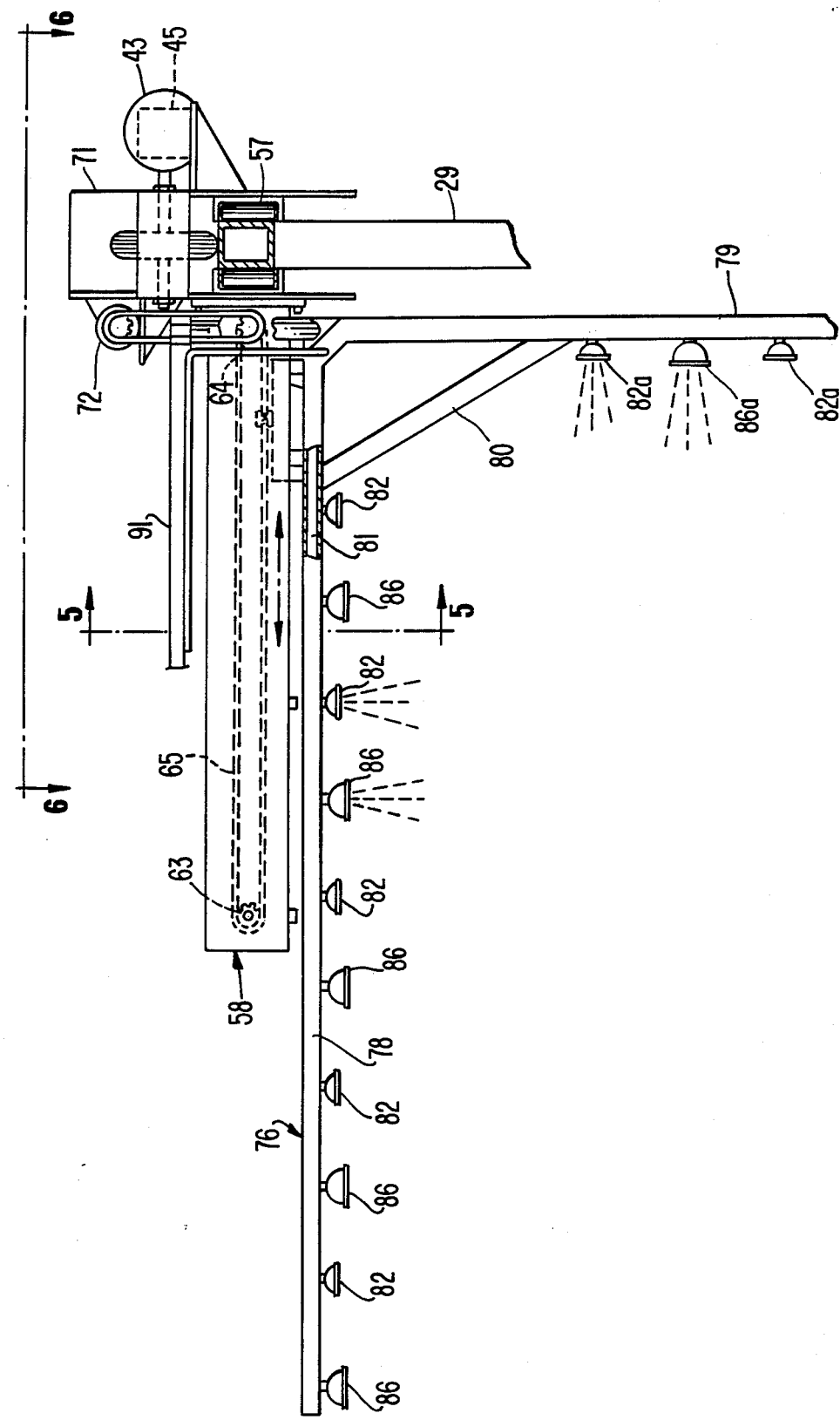
FIG. 4 is an enlarged cross-sectional view taken along line 4—4 in FIG. 3.
Figure 5:
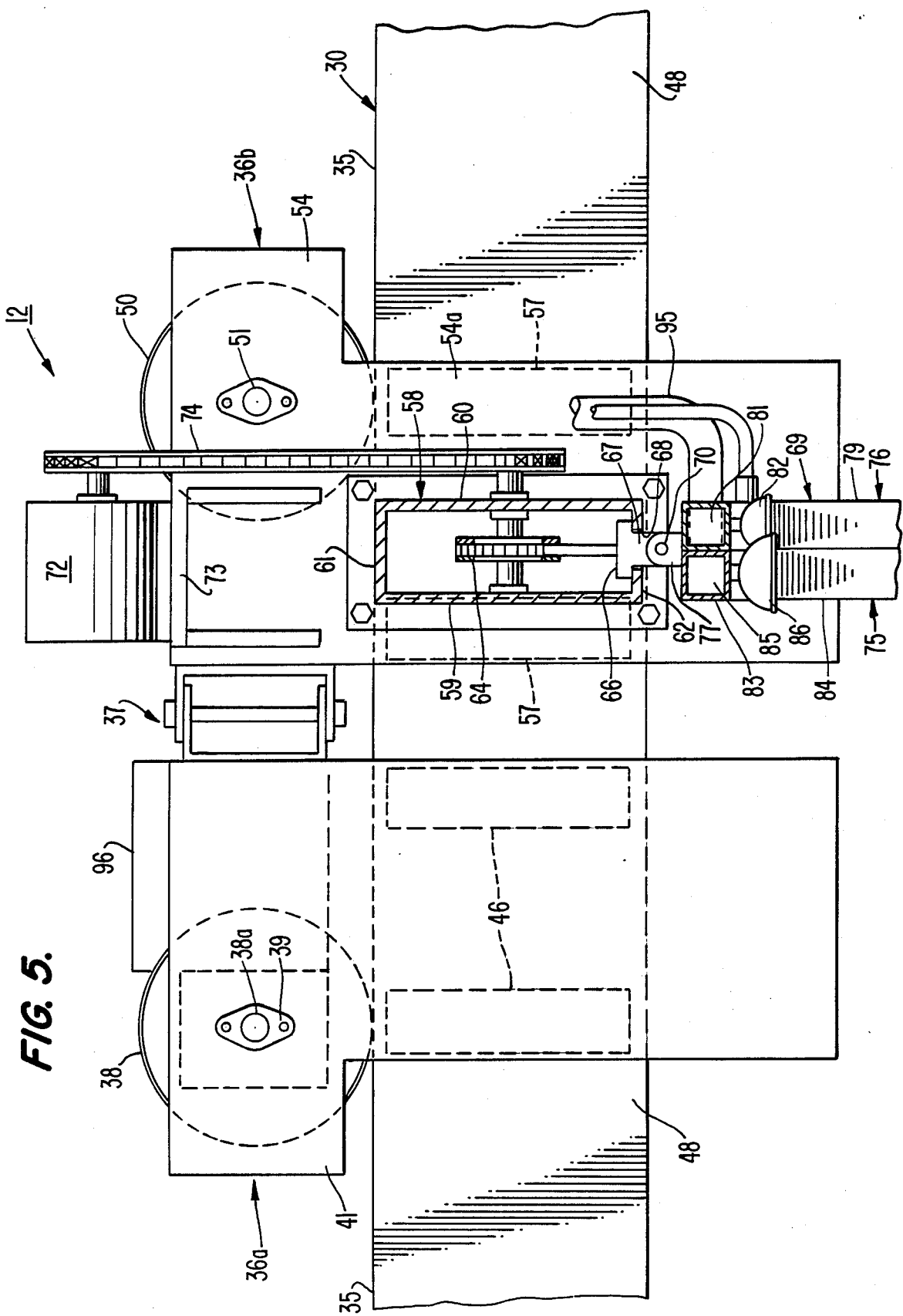
FIG. 5 is an enlarged cross-sectional view taken along line 5—5 in FIG. 4.
Figure 6:
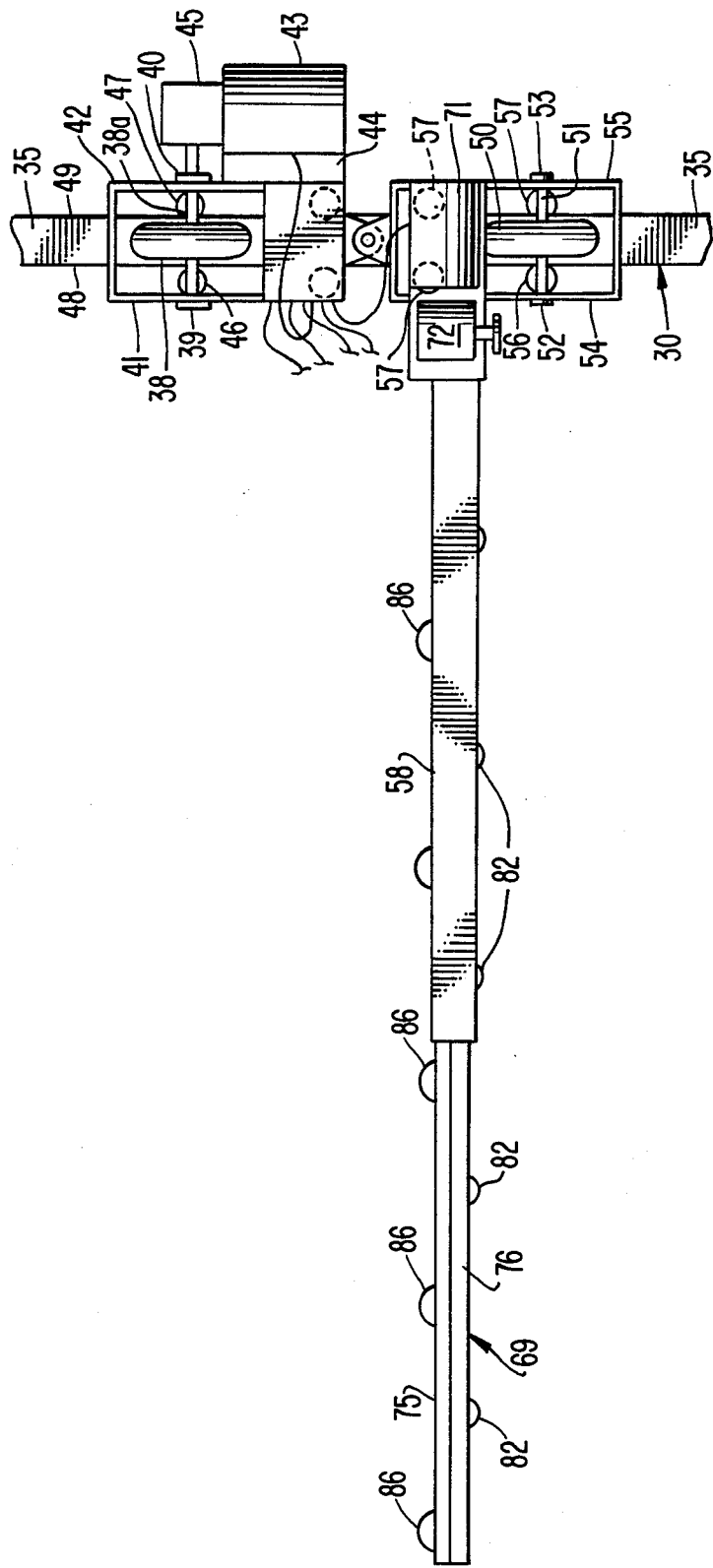
FIG. 6 is a cross-sectional view taken along 6—6 in FIG. 5.

As best illustrated in FIGS. 4 through 6, carrier unit 12 consists of articulated sections 36a and 36b joined together by a hinge assembly 37. Carrier section 36a is supported on track 30 by means of a rubber wheel 38 seated on upper track surface 36 and mounted on a wheel shaft 38a. The wheel shaft is journaled in a pair of bearing blocks 39 and 40 journaled in side walls 41 and 42 of carriage section 36a. The wheel shaft is driven by means of an electric motor 43 seated on a bracket 44, which transmits drive to the wheel shaft through a speed reducer 45. Lateral displacement of carriage section 36 is restricted by means of sets of guide rollers 46 and 47 which are mounted on depending portions of side walls 41 and 42 of carriage section 36a and engage inner and outer side walls 48 and 49, respectively, of track 30.

Carriage section 36b similarly is supported on track 30 by means of a rubber wheel 50 which is mounted on a wheel shaft 51. The shaft is journaled in a pair of bearing blocks 52 and 53 mounted on a pair of side walls 54 and 55. Carriage section 36b also is restricted from displacing laterally by means of sets of guide rollers 56 and 57 mounted on depending portions of side walls 54 and 55 and engaging inner and outer surfaces 48 and 49, respectively of track 30.

Rigidly secured to the outer side of depending side wall portion of 54a of carriage section 36a is a laterally extending support member 58 having a pair of side walls 59 and 60 and top and bottom walls 61 and 62. Journaled in side walls 59 and 60 and spaced laterally apart is a pair of sprockets 63 and 64 provided with a sprocket chain 65. As best shown in FIG. 5, the bottom flight of the sprocket chain is provided with a carrier element 66 having a depending portion 67 projecting through a transverse slot 68 in bottom wall 62 of arm member 58 to which there is hingedly secured a spray head support assembly 69 by means of a hinge pin 70. Sprocket 64 is driven by means of an electric motor 71 and speed reducer 72 mounted on a bracket 73 provided on carriage section 36b and a drive chain 74 which drops the drive from the speed reducer to sprocket 64. It will be appreciated that by operating motor 71 in either direction, sprocket chain 65 correspondingly will be driven in opposite directions to displace spray head support assembly 69 laterally or inwardly and outwardly relative to carriage section 36b.

Spray head support assembly 69 includes a pair of L-shaped frames 75 and 76 rigidly secured together in side-by-side relation and provided with a coupling member 77 for hingedly connecting the assembly to support element 66. As best seen in FIG. 4, support frame 76 includes an inwardly projecting, substantially horizontal arm section 78, a downwardly projecting, substantially vertical arm section 79 and an intermediate bracing member 80. Support frame 76 further is provided with an internal fluid passageway 81 which serves as a manifold to supply fluid under pressure to a first set of downwardly directed spray heads 82 mounted on the underside of arm section 78 and a second set of inwardly directed spray heads 82a mounted on arm section 79. Similarly, support frame 75 includes an inwardly projecting, substantially horizontal arm section 83, a downwardly projecting substantially vertical arm section 84 and a brace member (not shown). Support frame 75 further is provided with an internal fluid passageway 85 which serves as a manifold to supply fluid under pressure to a first set of spray heads 86 mounted on the underside of arm section 83 and a second set of spray heads 86a mounted on the inner sides of downwardly projecting arm section 79.

In the operation of the system as will later be described, it is desirable to apply certain chemical solutions onto the vehicle being washed at a low pressure to provide an atomized spray of such solutions, and to apply rinsing fluids in a spray under higher line pressure. To accomplish such result, the chemical solutions are dispensed through sets of spray heads 82 and 82a which are provided with small orifices than spray heads 86 and 86a which are provided with larger orifices. Preferably the orifices of spray heads 82 and 82a are sufficiently small to atomize the chemical solutions ejected therethrough and are about two-thirds the size of the orifices of spray heads 86 and 86a.

Figure 2:
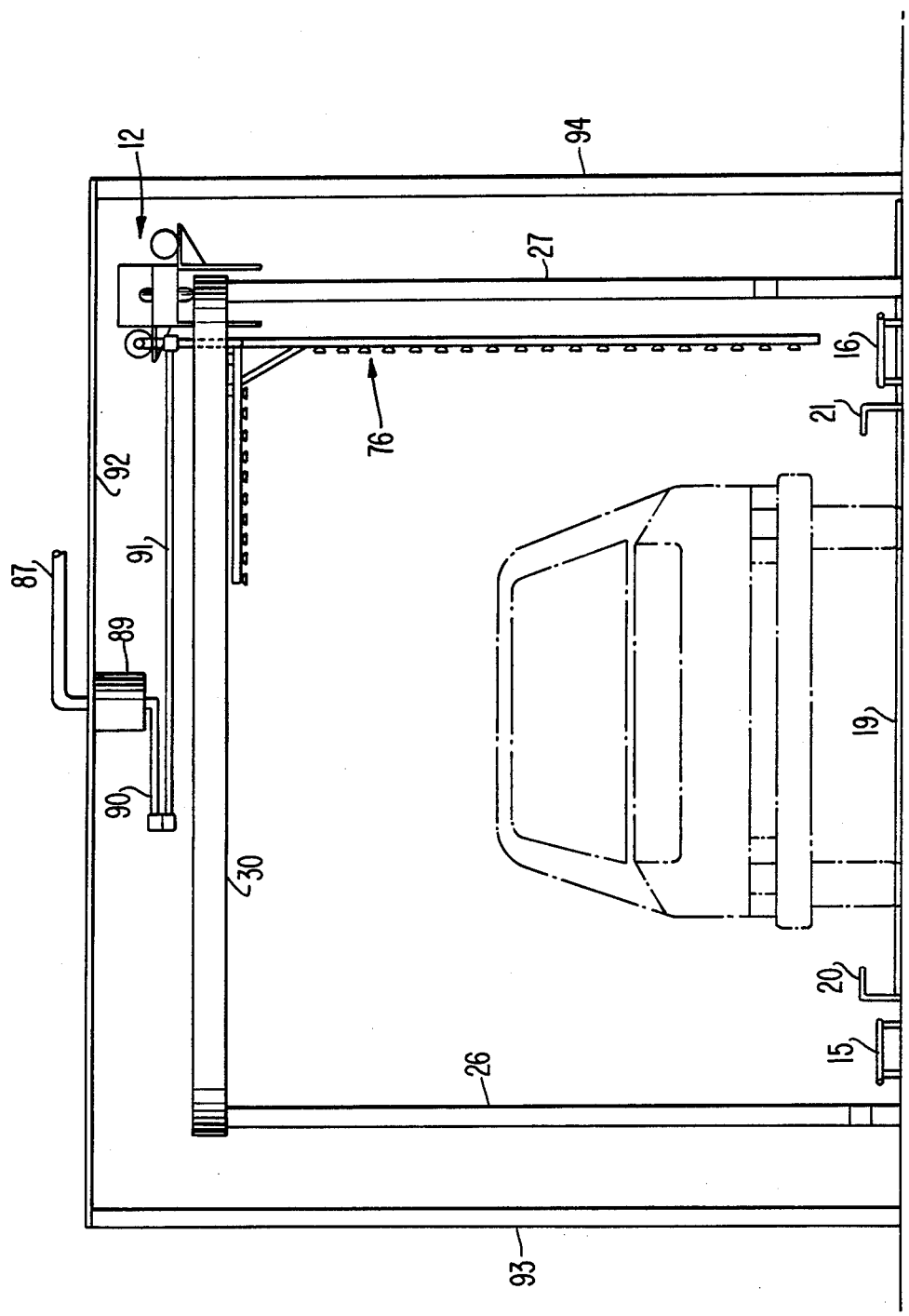
FIG. 2 is a front elevational view of the embodiment shown in FIG. 1.
Figure 3:
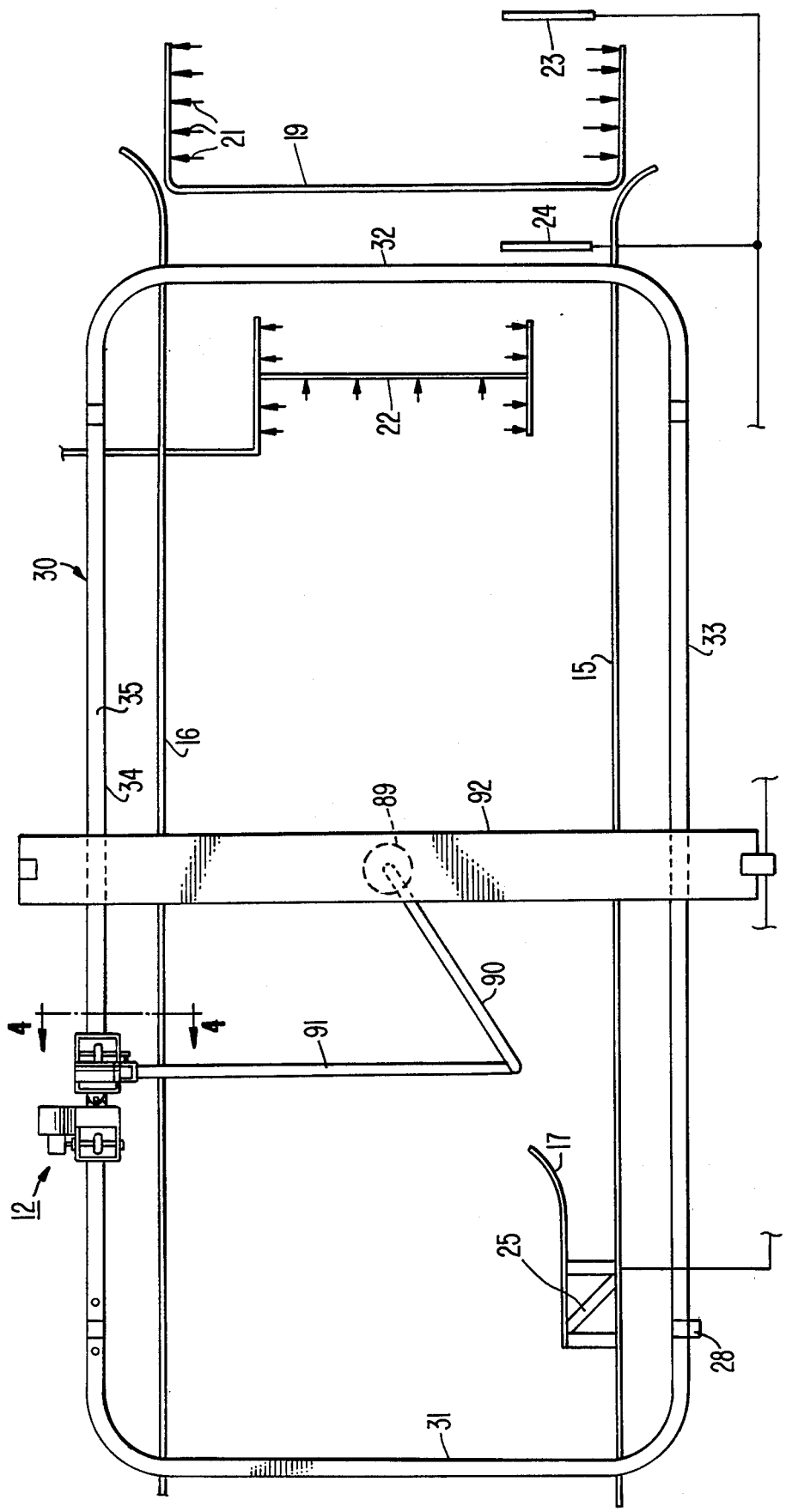
FIG. 3 is a top plan view of the embodiment shown in FIG. 1.

Referring to FIGS. 1 through 3, fluid under pressure is supplied to the spray head support assembly by means of a fluid supply conduit 87, a rotary fluid coupling 89 and articulated conduits 90 and 91. Fluid supply conduit 87 is connected to suitable regulating valves of fluid supply assembly 13 and is connected through the rotary fluid coupling 89 to articulated conduits 90 and 91. Fluid coupling 89 is mounted on a cross-beam member 92 disposed above track 30 and supported at its ends on a pair of post members 93 and 94 disposed outwardly of side sections 33 and 34 of track 30. Articulated conduits 90 and 91 interconnect the fluid coupling 89 and an inlet conduit 95 communicating with the fluid passageways of the spray head support assembly.

It is intended that different chemical solutions and also rinse water be supplied to the spray head support assembly through inlet conduit 87, fluid coupling 89, articulated conduits 90 and 91, and inlet conduit 95. In order to channel such diverse fluids into fluid passageways 81 or 85, there is provided a solenoid actuated diverter valve on support assembly 76.

Electrical service for operating the carrier unit is provided by an electrical line running along fluid supply conduit 87 to an electrical slip ring assembly combined with fluid coupling 89, and another electrical line from the slip ring assembly running along articulated conduits 90 and 91 which is connected to a distribution box 96 mounted on carriage section 36a. Electrical supply is provided by the distribution box to motors 43 and 71 in the conventional manner.

Referring to FIG. 8, the fluid supply assembly generally consists of a hot water tank 97, a chemical tank 98 containing a highly concentrated solution including a wetting agent and a solvent for oil base substances, a chemical tank 99 containing a highly concentrated detergent solution, a mixing tank 100 divided into two compartments 100a and 100b and a water holding tank 101. Hot water in a controlled temperature range of 130° to 150° F., and preferably at a temperature of 140° F. is supplied from the hot water heater through fluid supply conduit 102, flexible lines 103 and 104, proportioners 105 and 106 into compartments 100a and 100b, respectively, of mixing tank 100. Concentrated solvent from tank 98 is supplied through flexible supply line 107 and proportioner 105 into compartment 100a of mixing tank 100. Similarly, concentrated detergent solution from tank 99 is supplied through flexible supply line 108 and proportioner 106 into compartment 100b of mixing tank 100.

Proportioner 105 functions to introduce the desired proportion of chemical solution from tank 98 and hot water from heater 97 into compartment 100a where it is thoroughly mixed. The diluted solution from compartment 100a is fed through a line 109 into a pump 110 which selectively supplies such solution to fluid supply line 87 at a line pressure of 50 psi. Similarly, proportioner 106 introduces a desired proportion of concentrated detergent solution from tank 99 and hot water from heater 97 into compartment 100b where the concentrated solution and water are thoroughly mixed. The diluted detergent solution in compartment 100b is fed through a line 111 to a low pressure pump 112 which selectively supplies the diluted detergent solution to fluid supply line 87.

Fresh water for rinsing is provided to holding tank 101 from a main service line 113 through flexible line 114 and proportioner 115. If desired, a wax solution may be introduced into the water holding tank through a feed line 116 and proportioner 115. Fresh water is supplied to the system including fluid supply line 87 through a fluid line 117, a high pressure pump 118 driven by electric motor 119 through a valve bank 120.

In the operation of the embodiment as described, when a vehicle is driven toward the support surface 11, the left front wheel trips pressure switch 23 to energize motor 119 to supply water at a line pressure of 1,000 psi to spray unit 19 for directing sprays of water onto the wheels and lower portion of the vehicle. As the vehicle advances forwardly and the left front tire trips pressure switch 24, water under a line pressure of 1,000 psi will be supplied to spray unit 22 which functions to direct a high pressure spray to the undercarriage of the vehicle as it advances, guided by wheel guides 15 and 16. When the vehicle finally advances to the start position, the left front wheel of the vehicle will be positioned in the wheel well 18 and trip pressure switch 25. Under such conditions, the supply of water to spray units 19 and 22 will be cut off and the cycling sequence of carriage unit 12 will commence.

Carrier unit 12 is programmed to travel about track 30 dispensing cleaning solutions on the vehicle. As will later be described, as the carrier unit travels along track 30, the spray head support assembly will be caused to be displayed inwardly and outwardly relative to the vehicle depending on the size and configuration of the vehicle being washed. During the first cycle of the washing sequence, a solution consisting of a wetting agent and a solvent for oil based substances, at a temperature of 140° F., is supplied by low pressure pump 110 through supply conduit 87, fluid coupling 89, articulated conduits 90 and 91, inlet pipe 95 and passageway 81 to spray head 82 and 82a under a line pressure of 50 psi. The solution passing through the orifices of spray head 82 will be atomized and caused to be deposited on the surfaces of the vehicle as the carrier unit proceeds through the first cycle of the washing sequence. The wetting agent and solvent of the solution thus applied on the vehicle will penetrate and dislodge road film consisting of oil based substances and other foreign substances such as insects and the like. After the carrier unit has completed the first cycle and dispensed the fine spray of the first solution on the vehicle, a dwell time is incurred to permit the first solution to fully penetrate and dislodge the foreign substances on the surfaces of the vehicle.

Following the dwell time, the drive motor of the carrier unit is energized again to cause the carrier unit to cycle the second time about track 30. During such second cycle, detergent solution from compartment 100b is supplied in the same manner to spray heads 82 and 82a to be atomized and thus applied in a fine spray onto the surface areas of the vehicle for entraining and washing away the foreign substances penetrated and dislodged by the first solution.

After the detergent solution has been applied during the second cycling of the carrier unit, the carrier unit cycles two more times to provide a rinsing of the first and second solutions. Under such conditions, fresh water under a line pressure of 1,000 psi is supplied through passageway 85 and spray heads 86 and 86a to eject a high pressure spray onto the surface areas of the vehicle. To provide such high pressure spray, the solenoid operated diverter valve on the spray head support assembly is operated to divert the high pressure rinsing fluid from passageway 81 communicating with spray heads 82 and 82a to passageway 85 communicating with high pressure spray heads 86 and 86a.

Figure 7:
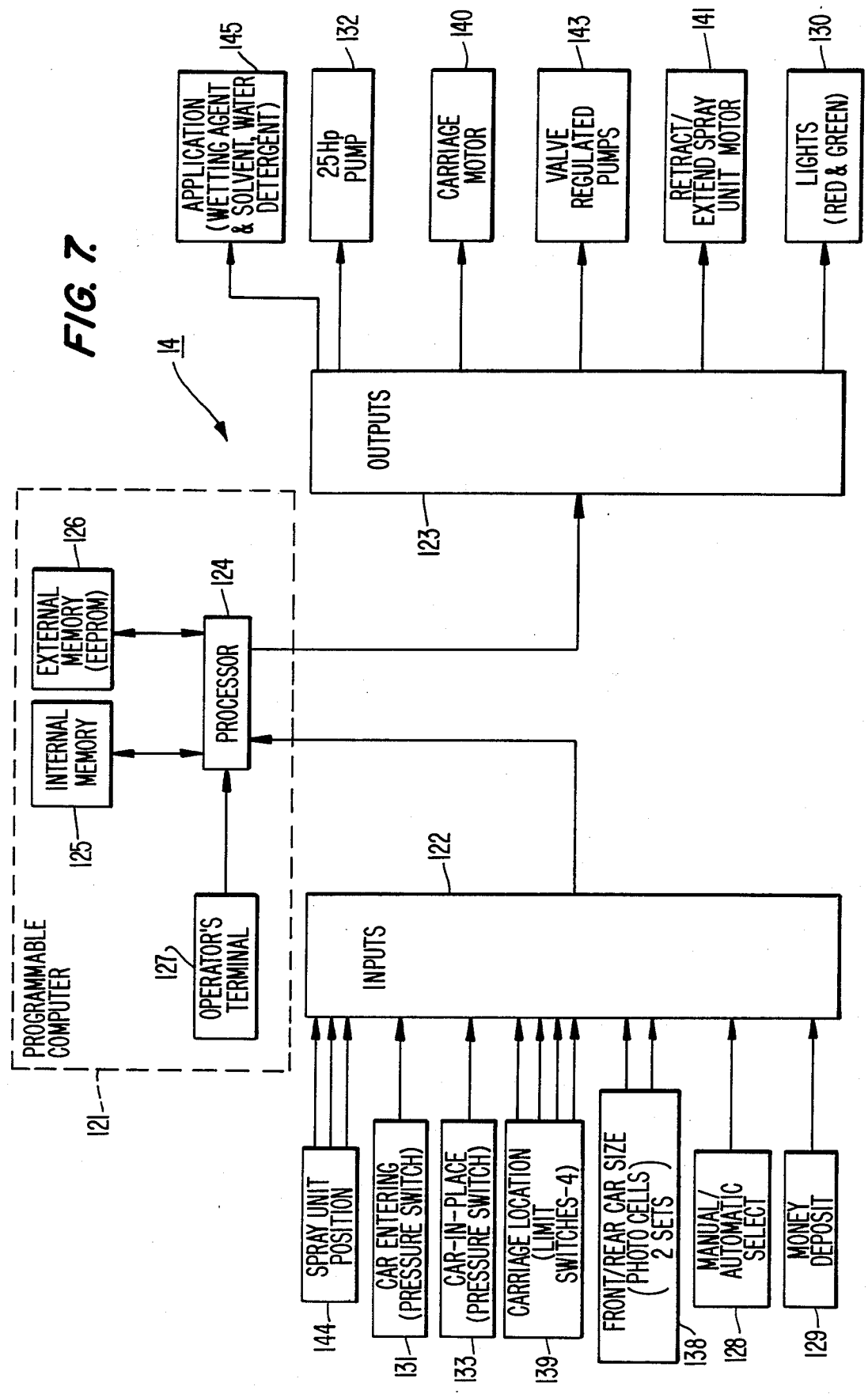
FIG. 7 is block diagram of the control system of the apparatus shown in FIGS. 1 through 6.

The operation of the embodiment as described is controlled by a programmable computer 121 as shown in FIG. 7. Computer 121 is adapted to receive a variety of inputs 122 which indicate the current status of the apparatus and the state of monitored conditions. The computer is adapted to provide a number of outputs 123 to control the apparatus in response to the inputs and its control program. The computer consists of a processor 124, an internal memory 125, external memory 126 and an operator's terminal 127. The processor may be, for example, an Allen Bradley Microprocessor, Model No. 1742-LP 120A, with an internal storage capacity of 884 words (16 bits per word). The operator's terminal may be used to program the processor with the program being stored in internal memory 125. The external memory 126 (e.g. EEPROM) is supplied to provide backup storage for the control program in the event of a power failure or an inadvertent erasure of the internal memory 125. The processor is programmed in a conventional manner to provide particular outputs as a result of particular inputs. Such input/output programming methods are well-known in the art and not pertinent to the description of the present invention.

In operation, processor 124 continually scans each of the inputs 122 and sequentially executes its control program stored in internal memory 125 or external memory 126. The processor executes the control program every eight milliseconds, typically. The operation is commenced with the manual/automatic select input 128 and money deposit input 129. The apparatus can be selected to operate either in a manual or automatic mode. Typically, the apparatus is operated in the automatic mode which requires the deposit of coins or paper money. If the processor receives a manual indication, or an automatic indication accompanied by a money deposited indicated, the entry lights 130 of the apparatus will be switched from a red to a green signal.

As the vehicle enters the apparatus and the left front wheel engages pressure switch 23, such occurrence will be recorded as input 131. The car entering input 131 will cause the processor to activate the high pressure pump output 132. High pressure pump 118 will then operate as previously described to provide water under line pressure of 1,000 psi to clean the wheels and undercarriage of the vehicle. When the vehicle advances to the start position, indicated by input 133, the processor will deactivate pump output 132 shutting off the wheel and undercarriage spray.

As soon as the vehicle reaches the start position, its length is sized by means of a first set of photoelectric detectors 134 and 135 mounted on post members 28 and 29, and a second set of photoelectric detectors 136 and 137 mounted on post members 26 and 27. As best illustrated in FIGS. 1 and 2, the emitters and transducers of the several photoelectric detectors are disposed at different heights so that the photoelectric light beam will be at an angle to the support surface instead of being substantially parallel as in most applications. The diagonal attitude of the light beams is provided to assure that the beams will be interrupted by any projecting portion of the vehicle. The various beams of the photoelectric detectors cooperate to detect the size of the vehicle to be washed. A full sized automobile will block both the front and rear cells. An intermediate size automobile will block either the front or rear sets of beams. A compact car will not obstruct any of the beams. The size inputs 138 from the photoelectric detectors are stored in internal memory 125 for use in controlling the lateral displacement of the spray head support assembly carried by the carrier unit. The spray head support assembly can be extended to or retracted from the front or rear of the vehicle depending on the size of the vehicle being washed. The assembly can be extended three feet for a small car, eighteen inches for an intermediate car or be completely retracted for a full size vehicle. The current position of the assembly (full-extension, mid-extension, retracted) is monitored by the processor through the spray head support position input 144.

The processor controls the operation of drive motor 71 based upon the stored size parameters of the vehicle and the location of the carriage unit along track 30. The processor monitors the carriage location inputs 139 which indicate the location of the carriage on track 30. The cycle is started with the carriage unit in the start position which is the right rear corner of the vehicle. The processor activates the carriage motor 43 through output 140. As the carriage unit travels along the length of the vehicle, the spray head support assembly is in the fully retracted position. The processor is notified when the carriage unit reaches the end of the car, i.e., near the front end of track section 34, position No. 1, by activation of a limit switch on the track indicated through location input 139. At such location, the processor will retrieve the size parameters stored in memory and activate output 141 to operate drive motor 71 as a function of the size information. For a full size vehicle, the spray head support assembly will remain fully retracted. For a compact size vehicle, the assembly will be fully extended. For an intermediate size vehicle, the assembly will be partially extended.

The spray head support assembly will remain in its current position while the carriage unit travels the width of the front of the vehicle, along track section 31. When the carriage unit reaches the end of track section 31, position No. 2, the processor is again notified through activation of another limit switch on the track. At this location, the processor will activate drive motor 71 to fully retract the spray head support assembly. If the assembly is not retracted within two seconds, carriage drive motor 43 is deenergized through output 140. When the carriage unit reaches the end of track section 33, position No. 3, the processor is again notified by activation of a limit switch on the track and again the extension of the spray head support assembly is determined in the same manner as it was upon reaching position No. 2 at the end of track section 34.

When the carriage unit reaches the end of track section 32, position No. 4, or "home position", the processor is notified through activation of another limit switch on the track. This completes one cycle of the car washing sequence and begins a new cycle. During each cycle, the same procedure as described above is performed through processor control. The processor will also monitor which cycle of the wash is in progress by simply counting the number of times the carriage returns to the home position. The processor will control high pressure pump output 132, valve regulated pump output 143 which operates the motors for low pressure pumps 110 and 112 and application output 145 as a function of the current cycle. The high pressure pump 118 is activated during the undercarriage and wheel spray operations and during the rinse cycles. The low pressure valve regulated pumps 110 and 112 are activated during the cycles in which the solution consisting of a wetting agent and a solvent for oil based substances and the detergent solution are applied.

Under some circumstances, it is possible that the photoelectric detectors might fail to detect a portion of a vehicle or an article positioned on the vehicle projecting in the path of the spray head support assembly which would obstruct the normal cycling movement of the assembly. To provide for such possibility, the spray head support assembly is hingedly connected to carrier section 37b so that upon engagement of the downwardly projecting section of the assembly with such an obstruction, the assembly will be caused to swing relative to carriage section 37a to ride over the obstruction. Such swing capability of the spray head support assembly would prevent damage either to the object obstructing the movement of the support assembly or to the support assembly itself. Preferably, the swinging action of the support assembly is retarded or spring biased in the vertical position so that as the carrier unit travels about the track, the support assembly will not be caused to drag or possibly oscillate. In addition, suitable sensors may be mounted on the carrier unit to detect when the support assembly has engaged either a surmountable or an insurmountable object so that the computer may produce an output signal to discontinue or otherwise interrupt the operation of the apparatus.

The microswitches for indicating the position of the carrier unit along the track are mounted on the underside of the track and are adapted to be tripped by suitable cam mechanisms carried by the carrier unit. Signals from such switches and similar switches mounted on the carrier unit for detecting the lateral displacement of the spray head support assembly are transmitted to the computer through lead lines passing along the fluid conduits and through the electrical slip ring assembly.

In lieu of the carrier unit consisting of a single section, the unit is formed in two articulated sections so as to more readily permit the unit to negotiate the curves of the track without causing undue tire wear or stress to the frame components. The use of rubber wheels provides a smooth ride for the carrier unit and avoids common wear, traction and binding problems of most wheel arrangements used in the prior art. Furthermore, in addition to being more simple and effective, the use of such wheels is far less costly than many more complicated arrangements of the prior art.

In accordance with the method of the present invention, there is contemplated the application of at least three separate fluids to provide the washing action. The first solution is intended to penetrate and dislodge foreign substances, mainly road film consisting of oil-bases substances and other foreign matter such as insects and the like. The solution of the first application includes a wetting agent and a solvent for oil-based substances. The wetting agent can be any suitable car wash detergent and the solvent may consist of methanol, isopropyl alcohol or ethelene glycol monobutyl ether. The solution of the first application is applied in a fine mist on the surface areas of the vehicle by atomization as previously described. The solution may be applied at a line pressure in the range of 35 to 55 psi and at a temperature in the range of 130° to 150° F. Preferably, the solution is applied at a line pressure of 50 psi and at a temperature of 140° F.

The second application is intended to provide a cleansing action by entraining and carrying away the substances dislodged by the first application. The solution of the second application generally consists of an alkaline-based detergent such as sodium lauryl sulphate. It also has been found that a detergent marketed under the brand name Power Wash consisting of sodium metasilicate, sodium tripoly-phosphate, Neodol 91-6 (a non-ionic surfactant), sodium sulfate and sodium carbonate may be used effectively. The solution of the second application also is applied in a fine mist by atomization as previously described. The solution may be applied at a line pressure in the range of 35 to 55 psi and at a temperature in the range of 130° to 150° F. Preferably, the solution is applied at a pressure of 50 psi and at a temperature of 140° F.

Prior to the second application, a delay of approximately 15 seconds is incurred to permit the solution of the first application to sufficiently penetrate and dislodge the foreign substances attached to the surface areas of the vehicle. The first application is applied in a mist in lieu of a hard spray so that the solution will adequately cover the surface areas of the vehicle and not bounce off of such surfaces and be lost. Similarly, the solution of the second application is applied in a fine mist and not as a hard spray so as to permit the second solution to be uniformly applied to the surfaces of the vehicle and provide the cleansing action by entraining and carrying away the substances dislodged by the solution of the first application.

The purpose of the third application and possibly a fourth application is simply to rinse the solutions of the first and second applications. The applications consist of spraying water onto the surfaces of the vehicle at a line pressure not less than 800 psi and preferably at a line pressure of 1000 psi. Such hard spray will clearly remove the solutions of the first and second applications and leave the vehicle surfaces free of such solutions which otherwise may cause streaking or spotting. As desired, a liquid wax solution may be introduced into the last rinsing application.

From the foregoing detailed description, it will be evident that there are a number of changes, adaptations and modifications of the present invention which come within the province of those persons having ordinary skill in the art to which the aforementioned invention pertains. However, it is intended that all such variations departing from the spirit of the invention be considered as within the scope thereof as limited solely by the appended claims.

I claim:

1. A vehicle washing apparatus comprising:
   means for supporting a vehicle to be washed,
   a first low pressure pump for applying a first solution at a low line pressure for penetrating and dislodging foreign substances on the surface of the vehicle,
   a second low pressure pump for applying a second solution at a low line pressure for providing a cleansing action by entraining and carrying away the foreign substances dislodged by said first solution, and
   means for applying fluid at a high line pressure for rinsing said first and second solutions from said vehicle.

2. A vehicle washing system according to claim 1 including means for atomizing said first and second solutions and spraying said fluid onto the surface of said vehicle.

3. A vehicle washing apparatus according to claim 1 including means for applying a second rinsing application of said fluid.

4. A vehicle washing apparatus according to claim 3 including means for applying a second rinsing application of said fluid at a high pressure.

5. A vehicle washing apparatus according to claim 3 including means for applying said second rinsing application at a pressure not less than 800 psi.

6. A vehicle washing apparatus according to claim 1 wherein said first pump applies said first solution at a pressure in the range of 35 to 55 psi.

7. A vehicle washing apparatus according to claim 1 wherein said first pump applies said first solution at a pressure in the range of 35 to 55 psi and at a temperature in the range of 130° to 150° F.

8. A vehicle washing apparatus according to claim 1 wherein said second pump applies said second solution at a pressure in the range of 35 to 55 psi.

9. A vehicle washing apparatus according to claim 1 wherein said second pump applies said second solution at a pressure in the range of 35 to 55 psi and at a temperature in the range of 135° to 145° F.

10. A vehicle washing apparatus according to claim 1 wherein said fluid applying means applies said fluid at a pressure not less than 800 psi.

11. A vehicle washing system according to claim 1 wherein said first pump applies said first solution at a pressure of approximately 50 psi and at a temperature of approximately 140° F., said second pump applies said second solution at a pressure of approximately 50 psi and a temperature of approximately 140° F. and said fluid applying means applies said fluid at a pressure of approximately 1000 psi.

12. A vehicle washing system according to claim 11 including means for atomizing said first and second solutions and spraying said fluid onto the surface of said vehicle.

13. A vehicle washing apparatus according to claim 11 including means for applying a second rinsing application of said fluid.

14. A vehicle washing apparatus according to claim 13 including means for applying said second rinsing application of said fluid at a pressure of approximately 1,000 psi.

15. A vehicle washing apparatus according to claim 14 including means for atomizing said first and second solutions and spraying said fluid onto the surface of said vehicle.

16. A vehicle washing apparatus according to claim 1 including means for applying a cleaning fluid to the wheels of said vehicle.

17. A vehicle washing apparatus according to claim 1 including means for applying a cleaning fluid to the underside of said vehicle.

18. A vehicle washing apparatus according to claim 1 wherein said first pump is adapted to apply a first solution comprising a wetting agent.

19. A vehicle washing apparatus according to claim 18 wherein said first pump is adapted to apply a first solution comprising a solvent for oil-based substances.

20. A vehicle washing apparatus according to claim 19 wherein said second pump is adapted to apply a second solution comprising a detergent.

21. A vehicle washing apparatus according to claim 20 wherein said second pump is adapted to apply a second solution comprising an alkaline-based detergent.

22. A vehicle washing apparatus according to claim 18 wherein said second pump is adapted to apply a second solution comprising a detergent.

23. A vehicle washing apparatus according to claim 1 wherein said first pump is adapted to apply a first solution comprising a solvent for oil-based substances.

24. A vehicle washing apparatus according to claim 23 wherein said second pump is adapted to apply a second solution comprising a detergent.

25. A vehicle washing apparatus according to claim 1 wherein said second pump is adapted to apply a second solution comprising a detergent.

26. A vehicle washing apparatus according to claim 25 wherein said second pump is adapted to apply a second solution comprising an alkaline-based detergent.

27. A vehicle washing apparatus according to claim 1 wherein said first pump includes a first chemical tank.

28. A vehicle washing apparatus according to claim 27 wherein said second pump includes a second chemical tank.

29. A vehicle washing apparatus according to claim 28 including a hot water supply.

30. A vehicle washing apparatus according to claim 29, wherein said first and second chemical tanks are each fluidly connected to separate mixing tanks.

31. A vehicle washing apparatus according to claim 30, including first proportioning means for controlling the amounts of chemical and hot water entering each mixing tank.

32. A vehicle washing apparatus according to claim 31, wherein said first and second pumps are each fluidly connected to separate mixing tanks.

33. A vehicle washing apparatus according to claim 32, wherein said fluid applying means comprises a water holding tank.

34. A vehicle washing apparatus according to claim 33 including a fresh water supply fluidly connected to said holding tank.

35. A vehicle washing apparatus according to claim 34, including a wax solution supply fluidly connected to said holding tank, and a second proportioning means for controlling the amounts of fresh water and wax solution entering said holding tank.

36. A vehicle washing apparatus according to claim 35, wherein said fluid applying means includes a high pressure pump.

37. A vehicle washing apparatus according to claim 27 wherein said first chemical tank is adapted to contain said first solution comprising a wetting agent and a solvent for oil-based substances.

38. A vehicle washing apparatus according to claim 1 wherein said second pump includes a second chemical tank.

39. A vehicle washing apparatus according to claim 38 wherein said second chemical tank is adapted to contain said second solution comprising highly concentrated detergent solution.

40. A vehicle washing apparatus according to claim 1 including a hot water supply.

41. A vehicle washing apparatus according to claim 1 including a mixing tank.

42. A vehicle washing apparatus according to claim 1, wherein said first and second pumps are each fluidly connected to separate mixing tanks.

43. A vehicle washing apparatus according to claim 1, wherein said fluid applying means comprises a water holding tank.

44. A vehicle washing apparatus according to claim 43, including a fresh water supply fluidly connected to said holding tank.

45. A vehicle washing apparatus according to claim 44, including a wax solution supply fluidly connected to said holding tank, and a second proportioning means for controlling the amounts of fresh water and wax solution entering said holding tank.

46. A vehicle washing apparatus according to claim 43, wherein said fluid applying means includes a high pressure pump.

47. A vehicle washing apparatus comprising:
means for supporting a vehicle to be washed,
first means for applying a first solution at a low line pressure for penetrating and dislodging foreign substances on the surface of the vehicle,
second means for applying a second solution at a low line pressure for providing a cleansing action by entraining and carrying away the foreign substances dislodged by said first solution,
third means for applying fluid at a high line pressure for rinsing said first and second solutions from said vehicle, and
means for atomizing said first and second solutions and spraying said fluid onto the surface of said vehicle.

* * * * *